2,934,441

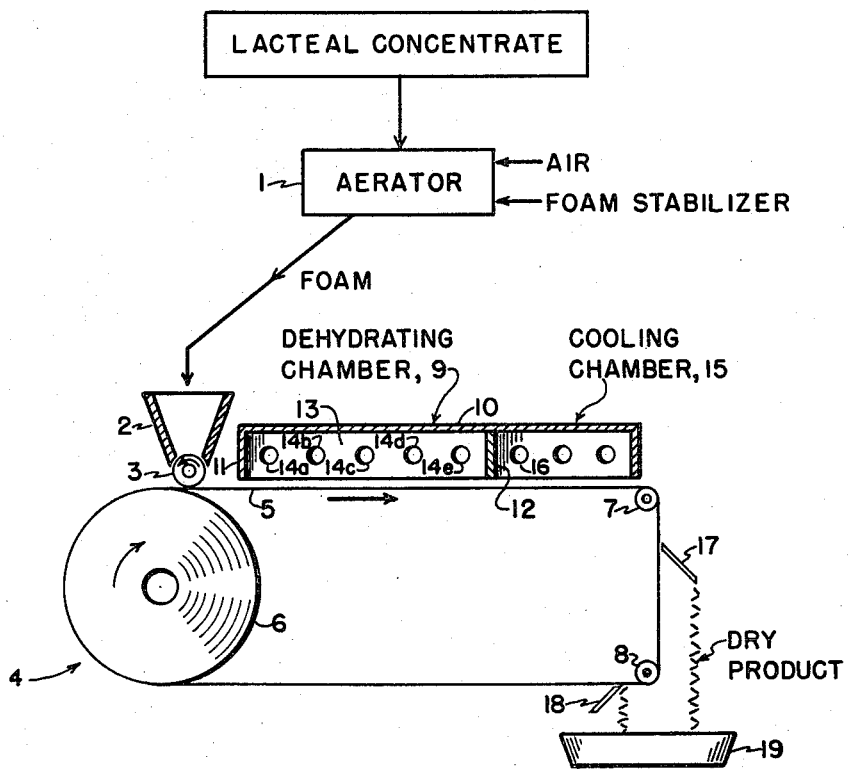

DEHYDRATION OF LACTEAL FLUIDS

Arthur I. Morgan, Jr., and John M. Randall, Berkeley, Calif., assignors to the United States of America as represented by the Secretary of Agriculture Application February 19, 1959, Serial No. 794,477

7 Claims. (Cl. 99—201)

(Granted under Title 35, U.S. Code (1952), sec. 266)

A non-exclusive, irrevocable, royalty-free license in the invention herein described, throughout the world for all purposes of the United States Government, with the power to grant sublicenses for such purpose, is hereby granted to the Government of the United States of America.

This invention relates to and has among its objects the provision of improved processes for dehydrating milk and other lacteal fluids. A particular object of the invention is the provision of processes wherein the dehydration is conducted under atmospheric pressure to yield porous solid products which can be rapidly and easily reconstituted to form a liquid having flavor, color, and nutrient value essentially the same as the starting material. Further objects and advantages of the invention will be apparent from the annexed drawing and the following description, wherein parts and percentages are by weight unless otherwise specified.

The single figure in the annexed drawing depicts schematically a flow sheet of the process of the invention and apparatus with which it may be carried out.

In the dehydration of milk a principal problem lies in the difficulty of obtaining products which will reconstitute readily. The mere subjection of milk to conventional dehydrating conditions such as exposing it to hot air or to the heated surface of a drum dryer will yield a product of very inferior rehydration characteristics. These products reconstitute very slowly and form liquids of a gritty or chalky texture. Recently it has been shown that milk can be successfully dried by exposing a layer of concentrated milk to vacuum under temperature conditions at which the product remains in a puffed or expanded condition. Although this process yields an excellent product, it requires expensive equipment because the drying mechanism must be in a vacuum-tight system and the maintenance of the vacuum by steam ejectors or the like during the dehydration involves a considerable expense.

In accordance with the present invention, the dehydration is accomplished under normal (atmospheric) pressure instead of under vacuum. Despite this departure from currently accepted procedures, the dehydrated products of the invention are in a porous condition and therefore rehydrate very rapidly. In addition, the reconstituted liquid is of smooth, non-gritty texture. Moreover, the dehydration is accomplished without material damage to the color, flavor, and nutritive content of the starting material. Since the dehydration is carried out at normal pressures, relatively inexpensive equipment may be used and operating expenses are minimized.

The objects of the invention are achieved by a procedure which includes these steps: First a liquid concentrate of the lacteal fluid is converted into a stable foam by incorporating therewith a minor proportion of a foam-stabilizing agent and a substantial volume of air or other gas. The foam so produced in the form of a relatively thin layer is then exposed at normal (atmospheric) pressure to a current of a hot gaseous medium until it is dehydrated.

The foam consists of a body of the lacteal concentrate throughout which is interspersed a multitude of gas bubbles. The presence of the bubbles gives the foam a volume substantially greater than that of the concentrate, per se. During the dehydration step, the mass of foam retains this expanded volume with the result that the final product is a brittle, sponge-like, porous mass consisting of a matrix of solid lacteal material in which is interspersed a multitude of voids. This porous mass can be easily crushed to form a product in the foam of porous flakes. These flakes on addition to water and stirring by hand for a few seconds form a reconstituted liquid free from lumps, grit, or other undispersed particles. The fact that the initial concentrate is applied to dehydration in the form of a foam and that the volume thereof is essentially maintained during dehydration are keys to the formation of the easily reconstituted porous product. Moreover, by such means the dehydration takes place rapidly and efficiently because moisture can diffuse readily out of the expanded mass.

In preparing the foam, a foam stabilizing agent is added to the liquid lacteal concentrate and air or other non-toxic gas such as nitrogen, carbon dioxide, nitrous oxide, helium, propane, n-butane, isobutane, dichlorodifluoromethane, trichloromonofluoromethane, trifluoromonochloromethane, etc. is incorporated therein. The chemical nature of the foam stabilizing agent is of no moment to the operability of the invention as long as the agent possesses the ability to stabilize foams. Various examples of suitable agents are listed hereinafter. The proportion of foam stabilizing agent will vary depending on the properties of the lacteal concentrate, the properties of the agent in question, etc. In general, the proportion of the agent may vary about from 0.1 to 4.0%, by weight based on the weight of solids in the concentrate. It is naturally desirable to use the lowest proportion of foam stabilizing agent compatible with production of a stable foam. Thus in any particular case, pilot trials may be conducted with different proportions of stabilizing agent and noting the stability of the foam after incorporation of gas. The stability of the foams may be easily determined by allowing the test batches of foam to stand at room temperature. A suitably stable foam is one which will retain its volume without any separation of gas from liquid for at least ½ hour, preferably at least one hour, when allowed to stand at room temperature.

Incorporation of the gas into the concentrate containing added foam stabilizing agent may be accomplished by any of the conventional methods used for example in aerating ice cream, salad dressings, and the like. A simple and efficacious expedient is to subject the concentrate to a rotating wire whip which beats air into the material. Another plan is to pump the concentrate through a conduit, a portion of which is of restricted cross-section to form a venturi, the gas being introduced at the zone of high velocity and low pressure within the venturi and so thoroughly commingled with and dispersed into the concentrate. For best results, it is preferred that the gas bubbles in the foam be of uniform small size, i.e., about 100 microns or less in diameter. The proportion of gas incorporated into the concentrate is generally regulated so that the gasified concentrate (foam) has a volume at least 1.5 times that of the concentrate prior to introduction of the gas. It is usually preferred that the foam have a volume about 2 to 3 times the volume of the concentrate to ensure formation of a highly porous dehydrated product. The foam volume may be increased above these levels to obtain even more highly porous products. Usually, however, it is desirable to limit the volume increase to about 5 times the original concentrate volume to avoid getting products having too low bulk density. That is, if excessive amounts of gas are added to the concentrate the dehydrated products although otherwise completely suitable from the standpoint of rehydration, taste, and color, will require too large a container to package a unit weight of product.

The concentrate may be cooled during introduction and dispersion of the gas therein; this generally promotes formation of a stable foam. If cooling is employed, any temperature below room temperature may be used provided the mass is not cooled enough to freeze it. Accordingly, temperatures not lower than about 35° F. are recommended.

Having prepared a foam as above described, the foam is spread out in a relatively thin layer and subjected to dehydration at atmospheric pressure by contact with a hot gaseous medium. The thickness of the layer of foam may be varied. Generally, layers about 0.01 to 0.5 inch thick give satisfactory results. Air is generally used as the gaseous dehydrating medium and excellent results are obtained therewith. However, if desired oxygen-free gases may be employed to avoid any possibility of oxidation of the product, in such event, one may use inert gases such as nitrogen, carbon dioxide, helium, or combustion gases, for example, the gaseous residue from burning of natural gas containing nitrogen, carbon dioxide, residual methane, etc.

Various types of equipment may be used for the dehydration. For example, one may use a conventional cabinet dryer wherein trays bearing the layer of gasified concentrate are subjected to a current of hot gaseous medium. The trays may be imperforate or even of screen material if the openings are not over about $\frac{1}{16}$ inch. The foam will not pass through perforations of such screens. Continuous dehydrators of various types may be used, for example, driers equipped with mechanical drive arrangements to move a support bearing a layer of the foam through the apparatus while it is contacted with currents of hot gas moving in concurrent, countercurrent, or cross-wise directions. The drier may be compartmentalized so that the advancing support bearing the foam may be subjected to gas currents at different velocities, temperatures, and directions. A preferred form of continuous drier is described in detail hereinbelow. The dehydration equipment, whether of batch or continuous type, may be provided with infrared or other radiant heaters to provide auxiliary heat to the layer of foam undergoing dehydration.

In the dehydration, the temperature of the gaseous medium may range from about 120 to about 220° F., the higher temperatures in this range providing more rapid elimination of moisture. As noted hereinabove, a critical feature of the process of the invention is that the volume of the foam is retained during dehydration, thereby the final product is in a porous, easily reconstituted form. To ensure such a result, the foam layer may be kept under observation during dehydration and the temperature of the gas reduced if the foam shows a tendency to decrease in volume. Thus, although it is desirable to use a high temperature to obtain a rapid elimination of moisture, the temperature should not be so elevated as to cause any substantial reduction in the volume of the foam. It is impossible to set forth numerical temperature limits in this connection because the stability of the foam will depend on many factors including efficacy of the foam stabilizing agent, temperature of the foam, moisture content of the foam, proportion of dissolved and insoluble solids in the foam, state of subdivision of the insoluble solids in the foam, chemical composition of the foam, size of gas bubbles in the foam, rate of heating of the foam, softening temperature of the product, etc. However, in any particular instance the gas temperature may be controlled in accordance with visual observation and this system of control affords a more reliable guide than could numerical limits.

It is evident that during the dehydration the temperature of the product will rise and eventually equal that of the hot gas stream. To avoid possibility of flavor damage by the product assuming too high a temperature, it is preferred to lower the gas temperature in the final stage of the dehydration. Thus for example, the gas temperature in the final stage of dehydration may be at a maximum of 120 to 160° F. whereby the product temperature will not rise above these limits.

After carrying out the dehydration as described above there is produced a solid dehydrated product having essentially the same volume as the foam and in a porous, spongy form. The product will generally have a moisture content of about 5%, or less. Generally, it is preferred to cool the dehydrated product before removing it from the tray, belt, or other equipment on which it was dehydrated. The cooling may be effected by contacting the product with a current of cool, preferably dry, air or other gas as exemplified above. Generally, the dehydrated product is cooled to about 70–100° F. and in such condition is especially brittle and easy to remove from the surface on which it is located. The product breaks up on contact with spatulas or scrapers into a mass of flakes or particles. In such form the product is ready for use or packaging.

In preparing the foam for dehydration it is necessary to start with a lacteal fluid in liquid concentrate form since the lacteal fluids in their normal state do not form stable foams. The invention may be applied to liquid concentrates prepared from any lacteal fluid, for example: whole milk; skim milk; cream; milks having butterfat content intermediate between that of skim milk and whole milk; buttermilk; whey; or milks flavored with sugar, chocolate, fruit juices, or the like. Methods of forming lacteal products into liquid concentrates are well known in the art. A typical method involves evaporating the lacteal fluid under vacuum at a temperature of about 50–150° F. to avoid heat damage to the product. For use in the process of the invention, the concentrate should have a solids content of at least 20% by weight. There is no upper limit in the solids content as long as the concentrate is liquid. Depending on the concentration of solids and the proportion of suspended undissolved solids, the concentrates may be sirupy, sauce-like or even of a pasty consistency. Any such liquids are considered as being liquids since they have fluid properties. It is generally preferred to employ concentrates which have as high a solids content as is compatible with retention of liquid character whereby the proportion of moisture which must be removed in the dehydration step in accordance with the invention is minimized.

As noted hereinabove, a foam stabilizing agent is incorporated into the lacteal concentrate so as to enable preparation of a stable foam. A multitude of such agents are known and the invention encompasses the use of any of them. The foam stabilizer may be a surface active agent or a hydrophillic colloid or a mixture of the two.

Typical examples of classes of surface active agents and individual compounds which may be used are listed below—

Fatty acid monoesters of inner ethers of hexitols, the fatty acids containing at least six carbon atoms. Illustrative of this class are sorbitan monolaurate, sorbitan monomyristate, sorbitan monopalmitate, sorbitan monostearate, sorbitan monooleate, and sorbitan monolinoleate. The corresponding fatty acid esters of mannitan may also be used.

Condensation products of ethylene oxide with sorbitan or mannitan monofatty acid esters. Typical among these compounds are ethylene oxide condensates of sorbitan monolaurate, sorbitan monomyristate, sorbitan monopalmitate, sorbitan monostearate, sorbitan monooleate, and the like. These condensates may contain anywhere from 6 to 60 moles of ethylene oxide per mole of sorbitan monoester.

Condensation products of ethylene oxide with long-chain carboxylic acids, that is, compounds of the formula $$R-CO-(OC_2H_4)_n-OH$$

where R—CO is the acyl radical of a fat acid such as lauric, palmitic, oleic, stearic, etc. and $n$ has a value from 6 to 60.

Condensation products of ethylene oxide with long-chain aliphatic alcohols, i.e., compounds of the formula $$R-(OC_2H_4)_n-OH$$

wherein R is the hydrocarbon radical of a long-chain alcohol such as dodecyl, tetradecyl, hexadecyl, octadecyl, oleyl, etc. and $n$ has a value from 6 to 60.

Mono- or di-esters of sucrose and fatty acids containing at least six carbon atoms. Illustrative compounds of this class are sucrose monolaurate, sucrose monomyristate, sucrose monopalmitate, sucrose monostearate, sucrose monooleate, sucrose dilaurate, sucrose dimyristate, sucrose dipalmitate, sucrose distearate, sucrose dioleate, and the like.

Monoglycerides of higher fatty acids, for example, glycerol monolaurate, glycerol monomyristate, glycerol monopalmitate, glycerol monostearate, glycerol monooleate.

Salts of higher fatty acids, for example, sodium palmitate, sodium stearate, sodium oleate, or mixtures thereof.

Higher alkyl sulphates, as for example, sodium dodecyl sulphate, sodium tetradecyl sulphate, sodium hexadecyl sulphate, sodium octadecyl sulphate, sodium oleyl sulphate.

Higher alkyl sulphonates, e.g., sodium dodecane sulphonate, sodium tetradecane sulphonate, sodium hexadecane sulphonate, sodium octadecane sulphonate, sodium oleyl sulphonate.

Alkylaryl sulphonates such as the sodium alkyl ($C_8$–$C_{20}$) benzene sulphonates. Typical in this class are sodium dodecyl benzene sulphonate and sodium hexadecyl benzene sulphonate.

Alkyl esters of sulphosuccinic acid, for example, the sodium salt of dioctyl sulphosuccinate.

Sulphonated or sulphated fatty acid esters or amides, i.e., compounds of the types:

$$RCO-O-CH_2-CH_2-SO_3Na$$

$$RCO-NH-CH_2-CH_2-SO_3Na$$

$$RCO-O-CH_2-CH_2-OSO_3Na$$

and $$RCO-NH-CH_2-CH_2-OSO_3Na$$

wherein RCO— represents the acyl radical of a long-chain fatty acid such as lauric, myristic, palmitic, stearic, oleic, etc.

Condensates of ethylene oxide and alkyl phenols, that is, compounds of the type: $R-C_6H_4-(OC_2H_4)_nOH$ wherein R represents an alkyl radical containing 6 to 20 carbon atoms and $n$ has a value of about 6 to 30.

Salts of bile acids, for example, bile salts as obtained from animal sources or alkali metal salts of individual bile acids such as cholic acid, dehydrocholic acid, desoxycholic acid, hydrodesoxycholic acid, dehydrodesoxycholic acid, dehydrodesoxycholic acid, lithocholic acid, glycocholic acid, or taurocholic acid.

It will of course be appreciated that the particular surface active agent for use in the process of the invention will be selected according to the use which is to be made of the final product. Thus where the product is intended for edible purposes, the surface active agent selected will be one which is edible or at least which may be ingested without adverse effects, approval for such use having first been obtained from the Food and Drug Administration. Thus for the production of edible products, we prefer to use surface active agents of the class of fatty acid esters of sorbitan or mannitan, agents of the class of polyoxyethylene sorbitan (or mannitan) fatty acid esters, agents of the class of polyoxyethylene derivatives of higher fatty acids, e.g., polyoxyethylene monostearate, agents of the class of sucrose mono- or di-esters with higher fatty acids, agents of the class of glycerol monoesters of higher fatty acid esters, agents of the class of bile salts, etc.

Generally it is preferred to employ surface active agents in order to stabilize the foam for dehydration since these agents are especially effective even when employed in very small proportion, for example, from 0.1 to 2% by weight based on the weight of solids in the concentrate. However, the foam stabilizer may be a mixture of a surface active agent and a hydrophillic colloid or may be a hydrophillic colloid alone.

Typical examples of hydrophillic colloids which may be employed are: soluble starch, sodium carboxymethyl cellulose, methyl cellulose, polyvinylpyrrolidone, agar, gum tragacanth, gum arabic, gum acacia, gum karaya, carragheen, alginic acid, sodium alginate, pectin, dextran, sodium carboxymethyl starch, sodium carboxymethyl amylose, sodium carboxymethyl amylopectin, pentosans, albumin, gelatin, sodium gluten sulphate, sodium gulten phosphate, dried egg white, dried glucose-free egg white, and the like.

The process of the invention is further explained as follows, with reference to the annexed drawing: A liquid lacteal concentrate, for example concentrated milk, is fed into aerator 1 which may take the form of a conventional device commonly used for aerating ice cream, salad dressings, or the like. Air and a foam stabilizer are likewise fed into aerator 1 to provide a foam of the proper volume and stability. The milk concentrate, now in the form of a foam, is fed into hopper 2 of dehydrator 4.

Dehydrator 4 includes a flexible, endless belt 5 made of elastic material, e.g., glass fibers coated with polytetrafluoroethylene, which is tautly disposed about drum 6 and rollers 7 and 8. Drum 6 is driven by suitable mechanism to continuously traverse belt 5 in the direction shown.

Hopper 2 and driven feed roller 3 extend in width essentially the same distance as the width of belt 5. Roller 3 in cooperation with hopper 2 deposits on belt 5 a thin layer of the foam. By suitable adjustment of the position of hopper 2 and roller 3 above belt 5 and control of the speed of feed roller 3, the foam is deposited in a thin layer on the order of 0.01 to 0.2 inch thick.

The layer of foam on belt 5 is carried through dehydrating chamber 9 wherein it is dehydrated by contact with hot air. Dehydrating chamber 9 takes the form of a bottomless compartment, essentially as wide as belt 5, and is formed by top plate 10, end plates 11 and 12, and side plates 13, only one of the latter being shown in the drawing. Ports 14a, 14b, 14c, 14d, and 14e are provided for introduction of hot air. This hot air flows transversely across the layer of foam causing it to be dehydrated forming a solid, porous product. Ports or other suitable vents are provided on the opposite side wall 13 of chamber 9 not shown in the drawing. It is evident that the length of chamber 9, i.e., the distance from plate 11 to plate 12 is long enough to permit the layer of foam to be dehydrated in the time of its passage through the chamber. Chamber 9 is not sealed from the atmosphere and the pressure therein is essentially normal atmospheric pressure.

The temperature of the hot air entering dehydrating chamber 9 via ports 14a, 14b, etc., as explained hereinabove is high enough to effectuate a rapid elimination of moisture from the concentrate yet not so high as to cause any substantial reduction in the volume of the foamed concentrate. The air temperature may be controlled in accordance with visual observation of the material undergoing dehydration and for this purpose, the walls of chamber 9 may be provided with windows, sight glasses, or the like.

It is evident that as the layer of foam passes through chamber 9, its temperature will rise and eventually equal that of the hot air stream. To minimize alteration of the natural flavor by the product assuming too high a temperature, it is preferred to employ hot air at reduced temperature during the final stages of the dehydration. For example, the air entering adjacent to the exit end of the dehydrating chamber, for instance through ports $14d$ and $14e$ may be at a maximum of about 120–160° F. whereby the product temperature will not rise above these limits. Suitable partitions similar to vertical plate 12 may be provided within chamber 9 to delineate the zones having hot air at different temperature levels.

After leaving dehydrating chamber 9, the dehydrated product is next transported by the belt to cooling chamber 15 which is constructed essentially the same as dehydrating chamber 9. Ports 16 are provided to contact the dehydrated product with a current of cool air. Chamber 15 is not sealed from the atmosphere and the pressure therein is essentially normal or atmospheric pressure. The product as it leaves the dehydrating chamber is generally in a plastic state and would be relatively difficult to remove from the belt. By applying cooling the product is put into a brittle state which facilitates its removal from the belt. Air having a low humidity is preferably employed in the cooling step to prevent moisture regain by the dry product. Generally, the volume and temperature of the air circulated through chamber 15 are so regulated to reduce the product to a temperature of 100° F. or below, usually to about room temperature (70° F.).

The cool, dehydrated product is then carried by belt 5 about rollers 7 and 8. These rollers are deliberately of a small size so that the belt is subjected to a sudden change in direction. Belt 5 being of flexible, rubbery material is able to repeatedly negotiate this abrupt turn without damage. However, the cooled, dehydrated product being now in a brittle condition is cracked into pieces and dislodged from the belt as it traverses rollers 7 and 8. The product now in the form of flakes or pellicles falls into receiver vessel 19. Doctor blades 17 and 18, spaced a small distance from the surface of belt 5, assist in freeing the loosened particles of product.

An important feature of the apparatus lies in the method of dislodging the dehydrated product from the belt 5. This method involves transversing the belt in a path which involves an abrupt change in direction. As a result the outer fibers of the belt are stretched relative to the inner fibers with the result that the product—being brittle—is cracked into fragments and dislodged from the belt. The desired effect is readily attained by conducting the belt over a guide member—such as a roller—with a change in direction or turn of at least 90°. The thickness of the belt and the radius of the guide member are so correlated that the outer fibers of the belt are elongated at least 5% relative to elongation of the inner fibers— those contacting the guide member. The following formula may be used to obtain the desired correlation:

$$\frac{r+t}{r} = e$$

wherein $r$ is the radius of the guide member, $t$ is the thickness of the belt, and $e$ is the ratio of the elongation of the outer fibers to that of the inner fibers. In using the formula, the values $r$ and $t$ are so chosen that $e$ has a value of 1.05 or more. For example, if the belt is 0.1 inch thick, a guide member having a radius of 2 inches will produce a relative elongation of 1.05, that is, the outer fibers will be stretched 5% more than the inner fibers. A greater degree of stretch, say 10%, would be obtained with the same belt conducted over a guide member having a radius of one inch. Inasmuch as this stretching of the outer fibers of the belt is employed to release the dehydrated product, it is necessary that the belt be made of elastic material so that it may withstand this stress without damage. Use of the above-described method of removing the dehydrated product from the belt offers the particular advantage that the use of belt-contacting scrapers or doctors is eliminated. Such devices rarely give satisfactory results because they score the belt surface and usually leave a thin film of dried material which as it builds up with continued operation interferes with proper operation and may contaminate the product with particles of hard, varnish-like dried material.

The invention is further demonstrated by the following illustrative example—

*Example*

The starting material was a three-fold concentrate of whole milk; solids content of the concentrate was 40%. One hundred parts of this concentrate was heated to 160° F. (to facilitate incorporation of the foam stabilizer) and to it was added 0.6 part of a commercial monoglyceride containing 90% of monoglycerides of fully-hydrogenated lard fatty acids. The mixture was agitated in a blender for one minute to uniformly disperse the monoglyceride in the milk concentrate. The monoglyceride-containing concentrate was cooled to 40° F. and whipped with a power-operated egg beater, rotated at about 700 r.p.m. for five minutes. A stable foam having a specific gravity of 0.3 was thus produced.

The foam was spread in a uniform layer ⅛ inch thick on a Teflon-coated glass fiber fabric. The layer of foam was then contacted with a current of air at 150° F. The foam was dehydrated to a moisture content of 1% in one hour forming a friable white solid with a fine porous structure which did not adhere to the drying surface.

A sample of the dehydrated product on addition to cold water and stirring by hand for a few seconds produced a reconstituted milk which was indistinguishable in odor, color, appearance, and flavor from a sample of the original concentrate suitably diluted with water. Moreover, the reconstituted liquid prepared from the dry product was stable in that it did not display any tendency for deposition of solids and was not gritty nor chalky.

Having thus described the invention, what is claimed is:

1. A process for preparing a dehydrated product from a liquid lacteal concentrate which comprises incorporating into the concentrate a gas and a minor proportion of a foam stabilizing agent to form a stable foam, spreading the foam into a relatively thin layer, contacting the layer of foam, at atmospheric pressure, with hot gaseous medium having a temperature, within the range about from 120 to 220° F., insufficiently high to cause the foam to substantially decrease in volume and continuing said contact of the hot gaseous medium with the foam until the foam is dehydrated to a solid, porous, readily rehydratable product.

2. A process for preparing a dehydrated product from a liquid milk concentrate which comprises incorporating into said concentrate a minor proportion of a foam stabilizing agent, whipping air into the concentrate to form a stable foam, spreading the foam into a relatively thin layer, contacting the layer of foam, at atmospheric pressure, with hot air having a temperature within the range about from 120 to 220° F., insufficiently high to cause the foam to substantially decrease in volume, and continuing said contact of the hot air with the foam until it is dehydrated to a solid, porous readily rehydratable product.

3. The process of claim 2 wherein the foam stabilizing agent is a glycerol monoester of a saturated higher fatty acid.

4. The process of claim 2 wherein the foam stabilizing agent is the glycerol monoester of palmitic acid.

5. The process of claim 2 wherein the foam stabilizing agent is the glycerol monoester of stearic acid.

6. A process for dehydrating a liquid lacteal concentrate which comprises incorporating a foam stabilizer and a gas into the concentrate to produce a foam, continuously applying the foam in the form of a thin layer on a flexible elastic support, continuously transporting said support bearing the layer of foam through a dehydration zone wherein the foam is contacted at normal atmospheric pressure with hot air having a temperature, within the range about from 120 to 220° F., insufficiently high to cause the foam to decrease in volume and continuing said contact of the hot air with the foam until the foam is dehydrated forming a solid, porous product, continuously transporting said support bearing the layer of dehydrated product through a cooling zone wherein the product is cooled at normal atmospheric pressure in an atmosphere of low humidity to a temperature below 100° F. continuously conducting said support bearing the layer of cooled, dehydrated product in a path which includes an abrupt change in direction whereby the cooled, dehydrated product is broken into pieces and dislodged from the support, and collecting the said product.

7. A process for preparing a dehydrated product from a liquid lacteal concentrate which comprises incorporating into the concentrate a minor proportion of a foam stabilizing agent, cooling the concentrate to a temperature below room temperature but above its freezing point and incorporating a gas herein to form a stable foam, spreading the foam into a relatively thin layer, contacting the layer of foam, at atmospheric pressure, with a hot gaseous medium having a temperature, within the range about from 120 to 220° F., insufficiently high to cause the foam to substantially decrease in volume, and continuing said contact of the hot gaseous medium with the foam until the foam is dehydrated to a solid, porous, readily rehydratable product.

References Cited in the file of this patent

UNITED STATES PATENTS

| | | |
|---|---|---|
| Re. 14,567 | Campbell | Dec. 17, 1918 |
| 1,250,427 | Campbell | Dec. 18, 1917 |